United States Patent Office 3,472,807
Patented Oct. 14, 1969

3,472,807
VINYL-CONTAINING COPOLYMER LATEX AND METHOD OF PREPARING SAME
Philip K. Isaacs, Silver Spring, Md., assignor to W. R. Grace and Co., New York, N.Y., a corporation of Connecticut
No Drawing. Filed Dec. 6, 1965, Ser. No. 512,003
Int. Cl. C08f 21/00
U.S. Cl. 260—29.6                    4 Claims

ABSTRACT OF THE DISCLOSURE

This invention relates to a process for forming an aqueous emulsion of a crosslinked copolymer structure, and the crosslinked copolymer structure resulting therefrom, which comprises admixing a vinyl-terminated long chain linear prepolymer with a vinyl monomer, forming an emulsion of said mixture in water and copolymerizing the vinyl monomer with the vinyl end groups of the prepolymer in said emulsion in the presence of a free radical emulsion polymerization catalyst.

---

This invention relates to a novel type of latex copolymer and a process for producing same. More particularly this invention relates to a stable vinyl-containing copolymer latex and a process for producing it in an aqueous system.

Vinyl latexes such as vinyl acetate latexes and urethane latexes are well known in the art. However, both of these latexes have drawbacks which limit their commercial acceptability in various applications. For example, vinyl acetate latex while having good non-blocking characteristics as required in coating applications, is brittle and has poor toughness. The art to overcome the brittleness drawback has added either external plasticizers or comonomers such as dibutyl maleate to increase flexibility of the vinyl acetate latex. Although the flexibility is increased by these additions, the toughness and non-blocking characteristics are decreased. In the case of urethane latexes as taught for example in U.S. 2,968,575, which have good flexibility and toughness, the drawback is that their shelf stability is poor due to settling and coagulation. An even more serious drawback however from the commercial viewpoint for these urethane latexes is their cost which precludes them from many commercial applications.

It is an object of the present invention to provide a relatively inexpensive latex product which has in combination good flexibility, toughness and non-blocking characteristics. A further object is to produce materials which exhibit good flexibility, toughness and non-blocking characteristics and which are capable of being formed into film and coatings. A still further object of the instant invention is to provide a process for producing relatively low cost latex products which are highly useful in various applications such as coatings.

It has now been found that the above objects are obtained with a novel urethane-vinyl copolymer latex by the steps of:

(1) reacting a conventional isocyanate terminated prepolymer of 500–5,000 molecular weight with 0.1 to 1 mole of a vinyl monomer containing only one active hydrogen per equivalent of free NCO in said prepolymer to form a prepolymer terminated at one end by a vinyl group, (2) chain extending the prepolymer terminated at one end by a vinyl group by reacting it with at least a stoichiometric amount of a compound containing a plurality of active hydrogen atoms, e.g. water, capable of reacting with all the isocyanate groups present thus forming a chain extended, urethane-containing prepolymer terminated on both ends with a vinyl group, (3) dissolving the chain-extended, vinyl-terminated, urethane-containing preploymer in a vinyl monomer or mixture of vinyl monomers thereby forming a solution containing 5–75% chain-extended, vinyl-terminated, urethane-containing prepolymer followed by emulsifying said solution in water in the presence of emulsifiers with vigorous agitation and (4) copolymerizing the vinyl monomer with the vinyl end groups of the chain extended, urethane-containing prepolymer in said emulsion in the presence of a conventional radical initiator for emulsion polymerization.

The conventional organic isocyanate prepolymers used in step (1) are well known in the art and can be made by various means. See for example U.S. 2,929,800. If, desired, the isocyanate terminated prepolymer can be formed by various well known reactions as will be shown in the specification and in an example hereinafter.

The vinyl monomers containing only one active hydrogen operable in the instant invention have the formula:

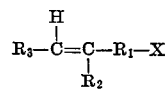

wherein $R_1$ is a member of the group consisting of

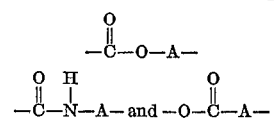

$R_2$ is a member of the group consisting of H,

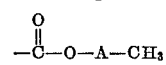

and an alkyl containing 1 to 2 carbon atoms, $R_3$ is a member of the group consisting of H,

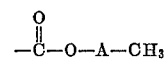

and an alkyl containing 1 to 2 carbon atoms and X is a member of the group consisting of —OH, —SH, —NH, —NH$_2$, —COOH, —CONH$_2$, —CONH—A—CH$_3$, —CSNH$_2$, —SO$_2$NH$_2$ and SO$_2$OH, where in all the aforesaid formulas A is an alkylene group containing 1 to 2 carbon atoms. Thus, vinyl monomers operable to react with the conventional prepolymer include but are not limited to, acrylic esters and methacrylic esters, vinyl esters, maleate and fumarate esters, itaconate, aconitate, and citraconate esters, crotonate esters and acrylic, methacrylic and maleic amides.

Examples of acrylic esters and methacrylic esters operable to react with the conventional isocyanate prepolymer in the instant invention include but are not limited to hydroxy ethyl acrylate, hydroxy propyl acrylate, hydroxy methacrylate and hydroxy propylmethacrylate. Examples of vinyl esters include but are not limited to vinyl glycolate, omega hydroxyl vinyl pelargonate and vinyl lactate. Examples of operable maleate and fumarate esters include but are not limited to monohydroxy diethyl maleate, monohydroxy diethyl fumarate, monohydroxy dibutyl maleate, monohydroxy dibutyl fumarate, monohydroxy dioctyl maleate and vinyl hydroxy dioctyl fumarate. Examples of other operable vinyl monomers include but are not limited to, vinyl hydroxy diethyl itaconate, monohydroxy triethyl aconitate, monodiethyl citraconate, hydroxy ethyl crotonate, hydroxy propyl crotonate and N-hydroxy methyl maleimide.

In the above formula for the vinyl monomers containing only one active hydrogen group, it is possible to substitute for X, various moieties as herein set out in a list above. However, although all these other groups are operable, the preferred group is the —OH group.

The chain extending agent used in the preparation of the urethane-vinyl copolymer latex of this invention is a compound containing two active hydrogen atoms capable of reacting with isocyanate, and contains not more than two atoms in the molecule with active hydrogen attached thereto. The preferred chain extending agent is water because of its cost and ease of handling. The term "active hydrogen atoms" herein refers to hydrogens which, because of their position in the malecule, display activity according to the Zerewitinoff tests as described by Kohler in J. Am. Chem. Soc. 49, 3181 (1927). In the chain extenders useful in this invention, the active hydrogen atoms are attached to oxygen, nitrogen or sulfur. The groups containing the active hydrogen will ordinarily be —OH, —SH, —NH—, —NH$_2$, —COOH, —CONH$_2$, CONHR where R represents an organic radical,

—SO$_2$OH

—SO$_2$NH$_2$, or —CSNH$_2$. The chain extending compound may be aliphatic, aromatic or cycloaliphatic or a mixture thereof. Typical organic compounds used, include but are not limited to, ethylene glycol, hexamethylene glycol, diethylene glycol, adipic acid, terephthalic acid, adipamide, 1,2-ethanedithiol, hydroquinone, monoethanolamime, 4-aminobenzoic acid, m-phenylenediamino propylenediamine, 1,4-butanedisulfonamide, 4-aminobenzamide, sulfanilamide, aminopropionic acid, 1,4-cyclohexanedisulfonamide, 1,3-propane disulfonamide, 4-hydroxybenzoic acid, p-aminophenol, ethylenediamine, succinic acid, succinamide, 1,4-butanedisulfonamide, 2,4-tolylenediamine, bis(4-aminophenyl) methane, beta-hydroxypropionic acid and 1,2-ethanedisulfonic acid.

Organic chain extenders have certain advantages which in certain circumstances make it desirable to use them instead of water. They are generally more soluble in the polyalkylene ether glycol/diisocyanate polymer than is water and their vapor pressures are in most cases much lower. Certain of the chain extending agents are considerably more reactive with isocyanates than others and the speed of reaction may be to some extent controlled by a suitable choice of extending agent. The amines are particularly reactive agents. When water, a carboxylic acid or a sulfonic acid is used as the chain extender, carbon dioxide is evolved during the reaction. With the other common organic chain extenders, no gas is evolved.

It is necessary and critical in the chain extending step of the instant invention to add sufficient chain extending agent to react with all the isocyanate groups on the vinyl terminated prepolymer. If insufficient chain extending agent is added, the amine formed from the reaction with water in the subsequent emulsification step, may interfere with the radical initiator used for the copolymerization. Additionally, if isocyanate groups are present during the emulsification step, they may react with the hydroxyl groups present in the emulsifying agents thereby causing instability and coagulation of the latex. Thus, in practicing the instant invention a stoichiometric amount or an excess thereof of the chain extending agent is added to the system containing the vinyl terminated prepolymer to react with all the isocyanate groups. The chain extended polymer resulting from such a step has a molecular weight of at least 1,000.

The vinyl monomer used to solubilize the chain extended prepolymer and thereafter copolymerized with same can contain one or more vinyl groups. Thus aside from conventional vinyl monomers such as substituted and unsubstituted vinyl carboxylic esters and amides and styrene, it is also possible to use divinyl monomers such as butadiene, isoprene, and chloroprene. Vinylidene compounds such as vinylidene chloride are also operable in the instant invention. Thus, any vinyl monomer or comonomer containing at least one

CH$_2$=C< group is operable to copolymerize with the vinyl terminated urethane prepolymer under the influence of the conventional radical initiators used in emulsion polymerization.

The emulsification step is conveniently and preferably carried out under ambient conditions.

The amount of water to be employed in the formation of the emulsion is not critical, although in general the minimum amount will be equal to the volume of the initial addition product or the solvent solution or slurry of this product. When too small an amount of water is employed resulting emulsions are too thick and are difficult to handle. On the other hand, emulsions which are too dilute are uneconomical due to their excessive volume.

Any conventional emulsifying agent which will give oil-in-water emulsions is satisfactory for use in the present invention. Satisfactory types of emulsifying agents are the polyethylene glycol ethers of long chain alcohols; quarternary ammonium salts; the tertiary amine or alkylol amine salts of long chain alkyl acid sulfate esters, alkyl sulfonic acids or alkyl aryl sulfonic acids; and alkali metal salts of high molecular weight organic acids. From 1% to 10% of the emulsifying agent based on the weight of the water employed will usually be found sufficient to produce stable emulsions.

Regarding the radical initiators for the copolymerization, the usual peroxides and azo compounds are operable including potassium and ammonium persulfates, hydrogen peroxide, cumene hydroperoxide and azobisisobutyronitrile. Redox activators may also be added such as ferrous salts, and bisulfites.

The urethane-vinyl coploymer latex of this invention may be prepared by the following general procedure. In one method the conventional prepolymer can be prepared by mixing a diisocyanate, e.g. 2,4-toluene diisocyanate with a polyalkylene ether glycol, e.g. polypropylene glycol preferably in a 2:1 mole ratio respectively at ambient temperature and pressure conditions in a closed vessel to exclude moisture. Temperatures up to 100° C. are operable with a temperature range of 60 to 100° C. being preferred. The mole ratio of the isocyanate to the polyalkylene ether glycol is such that at least a stoichiometric amount up to a 20% excess thereover of isocyanate groups are added to the system to react with the hydroxyl groups on the polyalkylene ether glycol. In addition, if desired, a catalyst to increase the reaction rate, e.g. dibutyl tin dilaurate can be added to the system.

The thus formed conventional prepolymer is then reacted with a vinyl monomer containing only one active hydrogen, e.g. propylene glycol monoacrylate at a temperature in the range 20 to 100° C., preferably 60 to 80° C. The mole ratio of the vinyl monomer to the isocyanate containing prepolymer is 1:1 to 10 preferably 1:2. It is preferable in performing this step that only sufficient vinyl monomer is added to the system to react with not more than one isocyanate unit per molecule. The product from this step (1) reaction, now containing an isocyanate group on one end and a vinyl group on the other, is reacted with a chain extending agent, e.g. water in a molar excess sufficient to react with the remaining isocyanate groups on the molecule. The reaction is performed in a temperature range from 20 to 100° C., preferably 60 to 80° C. in an open vessel with mild stirring at atmospheric pressure. The thus formed chain-extended vinyl-terminated urethane containing polymer has a molecular weight in excess of 1,000.

The chain-extended, vinyl-terminated polymer is then solubilized in a vinyl monomer or mixture of vinyl monomers, e.g. vinyl acetate to give a low viscosity solution containing 5–75% of the chain extended, urethane containing vinyl terminated polymer. Conventional emulsifying agents which will give oil in water emulsions are satisfactory for use in the emulsification step. For example, a polyvinyl alcohol sold commercially under the trade name "Elvanol 50–42" can be added in conventional minor amounts to the system to aid emulsification. In addition, it is also possible to add polymerization initiators such as potassium persulfate or azobisisobutyronitrile and buffers such as sodium carbonate without effecting the emulsification step. The mixture is emulsified in water at ambient conditions and pressure with high speed agitation. The emulsification step is carried on for 1 to 30 minutes or more. If desired, the polymerization initiator can be withheld from the emulsion step and added subsequently when the emulsified material is heated in the presence of the initiator to cause copolymerization.

Copolymerization of the thus emulsified product is performed in the presence of the initator at temperatures ranging up to the boiling point of the vinyl monomer. The copolymerization step is carried out for a period of 30 minutes up to 5 hours at atmospheric pressure at the refluxing temperature of the vinyl monomer. Following the copolymerization reaction the system is cooled to room temperature and the copolymer latex is recovered.

The conventional isocyanate terminated prepolymer employed as a reactant in the instant invention has the general formula: OCN-(prepolymer)-NCO.

In the above formula, the term "prepolymer" as shown above is initially terminated with isocyanate groups and is intended to include any polymeric polyurethane building unit, i.e. block.

These so called "block" polymeric units may be formed by numerous means using many different starting materials. Frequently they take the form of polyester, polyether, and polyglycol "prepolymers" having a molecular weight of from about 500 to about 3,000. In the case of polyester and polyether prepolymers the initial block or starting material is hydroxy terminated, and subsequently, the hydroxy terminated block is reacted with an excess of polyisocyanate so as to provide active isocyanate groups in the terminal positions. The formation of various types of prepolymer units which may be used in the practice of the present invention may be illustrated as follows:

1. Polyester Prepolymer—

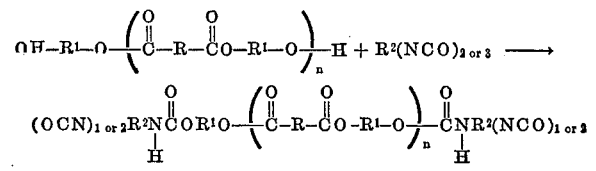

where in $n$ has a value of from 2 to about 8.

I. In the above equation R, R¹, and R² represent organic hydrocarbon and oxy interrupted hydrocarbon radicals which are present in the initial difunctional acids, alcohols and isocyanates used in the formation of the polyester prepolymer. These organic acids, alcohols and isocyanates may be selected from any of the prior art materials which have been used to form conventional polyurethanes. Typical examples of R are alkylene and alkenylene having from about 2 to 36 carbon atoms, and phenylene. These hydrocarbon residues are present in oxalic, adipic and dimerized linoleic acids.

R¹ represents alkylene having from about 2 to 8 carbon atoms, and dialkylene ether, -(alkylene-O-alkylene)-, wherein the alkylene radicals possess from about 2 to 8 carbon atoms. These radicals are derived from alcohols such as ethylene glycol, 1,3 butylene glycol, and ethoxyethyldiol.

R² is a difunctional or trifunctional isocyanate residue and may be lower alkyl phenylene

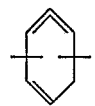

alkyl, wherein the alkyl group has 1 to 4 carbon atoms, diphenylmethane,

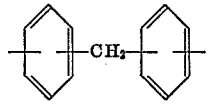

triphenylene-methane,

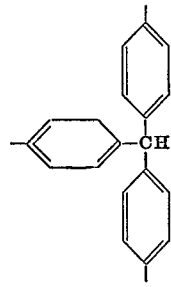

having 4 to 8 carbon atoms, lower alkyl and alkoxy diphenylene,

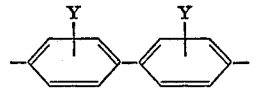

wherein Y represents alkyl and alkyoxy having 1 to 4 carbon atoms, and dialkylenebenzene,

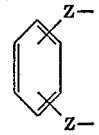

wherein Z represents alkylene radicals having 1 to 4 carbon atoms. Typical polyfunction isocyanates from which the above hydrocarbon residues may be derived are 2,4 and 2,6 toluene diisocyanate, 1,5 naphthalene diisocyanate, 4,4'-diphenylmethane diisocyanate, triphenylmethane triisocyanate, hexamethylene diisocyanate, tolidene diisocyanate, dianisidine diisocyanate, and m-xylylene diisocyanate.

Other suitable ester type materials from which isocyanate terminated prepolymers may be derived are castor oil and polyester glycols derived from caprolactone. Furthermore, the ester prepolymers may be crosslinked by incorporating a triol such as glycerine or trimethylolpropane.

II. Polyether Prepolymer

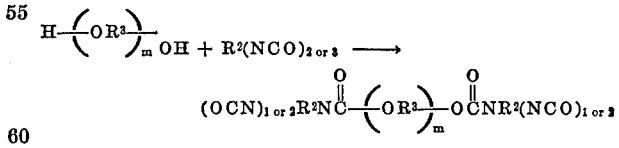

wherein $m$ has a value of from 10 to about 60 and R² has the meaning given in I above.

In the above polyether prepolymer R³ may represent both straight and branched chain alkylene having 2 to 8 carbon atoms and dialkylene thioether, -(alkylene-S-alkylene)-, wherein the alkylene groups possess 2 to 4 carbon atoms. Typical examples of R³ are

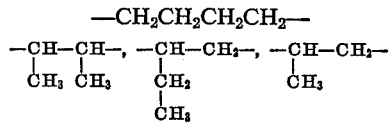

and

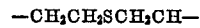

III. Glycol Prepolymer

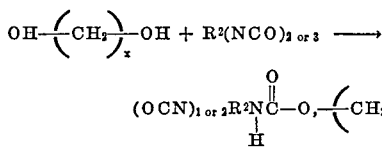

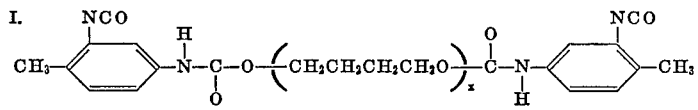

Wherein $x$ has a value of from 2 to about 6 and $R^2$ has the meaning given above.

The above generally defined "block" polymers or prepolymers are well known to those skilled in the art and may be prepared by any one of several known methods. Specific examples of particularly applicable prepolymers are

I.

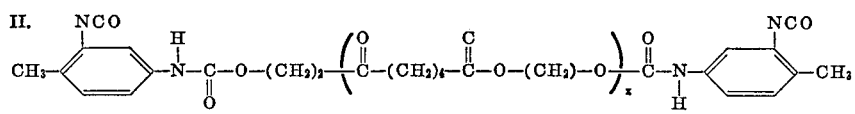

II.

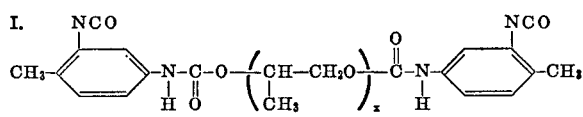

I.

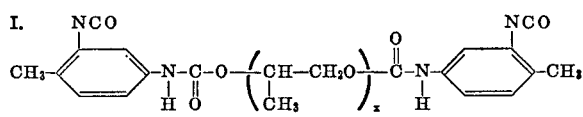

wherein the above prepolymers have an average molecular weight of about 2,000 and $x$ is so adjusted to give this value.

The following examples will more fully explain but expressly not limit the instant invention. In all examples unless otherwise noted all parts and percentages are by weight.

Throughout the instant invention tests were conducted as follows:

The particle size of the copolymer in the latex was estimated by turbidity on a Baush & Lomb Spectronic 20 Colorimeter in accordance with the instructions therefor.

The percent total solids in the latex was determined by accurately weighing a sample of the latex, drying said sample to constant weight and reweighing. The total solids was then calculated from the following formula:

$$\frac{\text{dry weight}}{\text{wet weight}} \times 100 = \text{percent total solids}$$

Tensile properties, i.e. tensile strength at failure, percent elongation at failure and 1% tensile modulus were measured in accord with ASTMD 412-64T. The copolymer latex was dried in film form (3 mils thick), cut to ¼" sample strips, placed in the jaws, (2" apart) of a tensile strength tester (Instron, Model TT, available from Instron Engineering Inc., Quincy, Mass.) and separated at a rate of 0.5" per minute and a strain rate of 50% per minute at 23° C. and 50% relative humidity.

The percent solubility of the copolymer latex in toluene was measured in the following manner. A film of the copolymer latex (approximately 3 mil thick) was dried and accurately weighed (initial weight). The film was then immersed in toluene at room temperature for 24 hours. The insoluble copolymer residue was dried and reweighed (final weight). The percent soluble in toluene was calculated as follows:

Percent soluble in toluene =

$$\frac{\text{initial sample wt.} - \text{final sample wt.}}{\text{initial sample wt.}} \times 100$$

Blocking was determined by laying down a 3 mil thick film of the copolymer latex using a 6 mil drawbar on a 100% cotton fiber bond typing paper. The films were dried in air and heated to 110° C. to insure consolidation.

The coated paper was then placed face-face and face-back under a load of 1 p.s.i. at 50° C. for 24 hours. One set of samples was placed in the oven at ambient humidity, and another in a dessicator held at 65% relative humidity (RH). After the elapsed time, the samples were cooled and pulled apart by hand. Any tack or fiber tear was noted.

The extent of oxidation of polyethylene was determined by ascertaining the carboxyl content of the polymeric material by titration with base in the following manner. About 1 g. of the polymer to be analyzed was accurately weighed and dissolved in 200 ml. of xylene by heating to 120–130° C. with stirring in a 500 ml. Erlenmeyer flask on a magnetic stirrer-hot plate. About 15 drops of 0.1% phenolphthalein in absolute ethanol was added. While continuing stirring and maintaining the temperature at 120–130° C., the solution was titrated to a pink end point with standard 0.05 N potassium hydroxide in absolute ethanol.

Calculation:

$$\text{milliequivs. COOH per g.} = \left(\frac{(\text{ml. of KOH})(\text{N of KOH})}{\text{g. of polymer}}\right)$$

Melt indices (MI) were measured under the conditions specified in ASTMD 1238–57T under Condition E (melt index, i.e. MI) and Condition F (high load melt index, i.e. HLMI).

Densities of the polymer in g./cc. were measured under the conditions specified in ASTMD 1505–57T.

Reduced specific viscosity, i.e. RSV, in deciliters/g. was obtained by dissolving 0.1 g. of the polymer for RSV's of 10 and under and 0.02 g. of the polymer for RSV's over 10 in 100 cc. decalin at 135° C. in accord with the procedure of ASTMD 1601–61.

The crystalline melting point of the polymer was measured as the temperature at which birefringence disappears from the sample when viewed through crossed Nicol prisms in a hot stage microscope heated at a rate of 1° C./min.

The following examples will describe but not limit various methods of making the vinyl copolymer latex of the instant invention. In all examples herein, unless otherwise noted, all parts and percentages are by weight.

Example 1

To a glass resin kettle equipped with a Teflon stirrer was charged 1 mole of polypropylene glycol having a molecular weight of 1200 and 2 moles 2,4-toluene diisocyanate; 0.1% by weight of dibutyl tin dilaurate was added as a catalyst and the kettle was closed to exclude moisture. Agitation was commenced and the mixture was reacted for 2 hours at 60° C. Agitation was stopped and 0.5 mole propylene glycol monoacrylate was added to the system and agitation was continued for an additional 1½ hours at 70° C. A 5X molar excess of water necessary to react with the remaining isocyanate groups on the vinyl terminated prepolymer was then added to the system and the reaction was continued for 1½ hours at 70° C. During the reaction foaming occurred indicating the evolution of $CO_2$ from the chain extension reaction. The reaction mixture became very viscous. The thus formed urethane containing vinyl terminated prepolymer was used in the following examples to form vinyl-urethane copolymer latexes.

Example 2

20 parts of the vinyl terminated prepolymer product from Example 1 was charged to a Sorvall Omni-Mixer (500 ml.) along with 80 parts vinyl acetate, 2 parts of a commercial emulsifier sold under the tradename "Elvanol 50–42" and 3 parts of an emulsifier sold under the trade name "Abex VA 40," 0.05 parts of a potassium persulfate polymerization initiator, 0.05 parts of sodium bicarbonate (buffer) and 100 parts of water. The mixture was emulsified for 2 minutes at 16,000 r.p.m. The thus emulsified product was transferred to a glass resin kettle equipped with thermometer and reflux condenser. The kettle was maintained at a 70° C. bath temperature. Polymerization in the kettle was carried out for 1½ hours with stirring under reflux at 70–75° C. The reaction was then cooled to room temperature and the urethane-vinyl copolymer latex was subjected to characterization.

The latex contained a total solids of 44% having an average particle size of 0.45 microns. A film of the latex had a tensile strength of 2300 p.s.i., a percent elongation of 219% and a 1% tensile modulus of 270,000 p.s.i. A sample of the latex was extracted with toluene for 24 hours at room temperature. The latex film was 50% soluble in toluene. Characterization of this vinyl-urethane latex product is shown under copolymer A in Table I.

Example 3

50 parts of the vinyl terminated prepolymer product from Example 1 were charged to a Sorvall Omni-Mixer (500 ml.) along with 50 parts vinyl acetate, 4 parts "Elvanol 50–42," 6 parts "Abex VA 40," 0.05 parts potassium persulfate, 0.05 parts sodium bicarbonate, and 150 parts water. The mixture was emulsified for 2 minutes at 16,000 r.p.m. The thus emulsified product was transferred to a glass resin kettle equipped with thermometer and reflux condenser. Polymerization in the kettle was carried out for 1½ hours with agitation under reflux at 70–75° C. The kettle was cooled to room temperature and the urethane-vinyl copolymer latex was subjected to characterization. The latex contained 35% total solids having an average particle size of 0.5 microns. A film of the latex had a tensile strength of 1800 p.s.i., a percent elongation of 202% and a 1% tensile modulus of 57,000 p.s.i. A sample of the film was subjected to extraction by toluene and after 24 hours 0% was found soluble in toluene. A coating of the copolymer latex on typewriter paper when tested for blocking in accord with the procedure set out herein showed no blocking. Characterization of this vinyl-urethane latex is shown under copolymer B in Table I.

For control purposes a conventional copolymer latex was made up as in the following example.

Example 4

65 parts of vinyl acetate monomer and 35 parts dibutyl maleate were charged to a glass resin kettle with Teflon stirrer along with 4 parts "Elvanol 50–42," 6 parts "Abex VA 40," 0.05 parts potassium persulfate, 0.05 parts sodium bicarbonate and 100 parts water. The mixture was stirred slowly for 1 hour at vinyl acetate refluxing temperature, i.e. 78° C. The thus formed conventional vinyl acetate-dibutyl maleate copolymer latex was then characterized and the results are reported in Table I under copolymer C.

The pH of the latex can be varied over a wide range, i.e. 2–11. Due to the fact that some of the vinyl monomers hydrolyze, e.g. vinyl acetate will hydrolyze at a pH above 6, it is preferred to maintain the pH in the range of 3–6.

In practicing the instant invention it is also possible to employ commercially available prepolymer terminated by isocyanate groups to react with the vinyl monomer containing 1 active hydrogen. Examples of such reaction with various vinyl monomers being employed in the copolymerization step are set out below.

Example 5

1 mole of a commercially available isocyanate terminated prepolymer sold under the trade name "Multrathane F 196" by Mobay Chemical Co. was charged to a glass resin kettle equpped with a Teflon stirrer along with 0.5 mole of propylene glycol monoacrylate. The kettle was closed to exclude moisture and the mixture was reacted for 1½ hours at 70° C. to form a urethane-containing prepolymer partially terminated on one end with an acrylate group. Thereafter agitation was stopped and a 5X excess of water was added to the reaction to chain extend the prepolymer by reacting with the remaining isocyanate groups in the prepolymer. The chain extension reaction was continued for 1½ hours at 70° C. and atmospheric pressure. During the reaction the mixture became very viscous and foaming occurred indicating the evolution of $CO_2$ from the chain extension reaction.

20 parts of the thus formed vinyl-terminated chain-extended, urethane-containing prepolymer was charged to a Sorvall Omni-Mixer (500 ml.) along with 80 parts of methyl acrylate, 2 parts of a nonionic emulsifier sold under the trade name "Igepal CO 880" by General Anilin, 3 parts of a polyvinyl alcohol sold under the trade name "Elvanol 50–40" by E. I. du Pont de Nemours Co., 0.1 part potassium persulfate, 0.1 part sodium bicarbonate and 80 parts water. The mixture was emulsified for 2 minutes at 16,000 r.p.m. at ambient temperature and pressure. The thus emulsified product was transferred to a glass resin kettle equipped with thermometer and reflux condenser wherein the copolymerization reaction was carried out for 2 hours with stirring at 70° C. On cooling the urethane-vinyl copolymer latex was found to be stable over a 12 month period.

Example 5 was repeated using ethyl acrylate, styrene and vinylidene chloride as the vinyl monomer in the copolymerization step. In all cases a stable urethane-vinyl copolymer latex was obtained.

The following example and the results in Table II show the improved properties obtained by the urethane-containing copolymers of the instant invention as compared to urethane-containing blends.

Example 6

5 parts of the vinyl terminated prepolymer from Example 1 were mixed with 65 parts of vinyl acetate and 35 parts of dibutyl maleate. The vinyl terminated prepolymer and mixed monomers were stirred gently into an aqueous phase consisting of 3.5 parts of "Pluronic F88" (an emulsifier), 1.8 parts of "Monawet MT70" (an emulsifier), 0.06 parts of potassium persulfate, and 148 parts of distilled water. The coarse emulsion was then homogenized through a Manton-Gaulin homogenizer at 7500 p.s.i. and room temperature. The thus emulsifed

TABLE I

| Example No. | Copolymer | Latex Properties | | Film Properties | | | | Blocking Resistance [a] of Latex Coating Face to Back | |
|---|---|---|---|---|---|---|---|---|---|
| | | Total Solids in Latex (percent) | Particle Size (microns) | Ultimate Tensile (p.s.i.) | Ultimate Elongation (percent) | 1% Modulus (p.s.i.) | Percent Soluble in Toluene | Dry | 65% Relative Humidity |
| 2 | A | 44 | 0.45 | 2,300 | 219 | 270,000 | 50 | N | N |
| 3 | B | 34 | 0.5 | 1,800 | 202 | 57,000 | 0 | N | T |
| 4 | C | 55 | 0.5 | 300 | 500 | 700 | 100 | T | B |

[a] Blocking Resistance Code.—N=No blocking or tack; T=Tack but no fiber tear; B=Blocking ebuals fiqer tear.

product was transferred to a resin kettle equipped with reflux condenser and thermometer. Polymerization was carried out therein for 5 hours at 75–80° C. The kettle was cooled and the product was subjected to characterization. Its behavior and properties were compared with a blend of pure urethane latex and the vinyl acetate-dibutyl maleate copolymer latex of Example 4 with varying amounts of urethane content. The results are shown in Table II.

TABLE II

| Polymer | Percent Urethane in Copolymer or Blend | Tensile (p.s.i.) | Elongation (percent) | Modulus (p.s.i.) | Tensile × Elongation |
|---|---|---|---|---|---|
| Example 6 (copolymer) | 5 | 840 | 460 | 1,852 | $3.8 \times 10^5$ |
| Example 4 (control) | 0 | 300 | 500 | 700 | $1.5 \times 10^5$ |
| Example 4 Blend §1 | 5 | 320 | 550 | 710 | $1.8 \times 10^5$ |
| Example 4 Blend §2 | 10 | 340 | 590 | 720 | $2.0 \times 10^5$ |
| Example 4 Blend §3 | 20 | 420 | 600 | 730 | $2.5 \times 10^5$ |
| Example 4 Blend §4 | 40 | 1,000 | 650 | 750 | $6.5 \times 10^5$ |

Table II shows that the copolymerized latex of Example 6 containing 5% urethane imparts as much toughness (toughness=tensile×elongation) to a vinyl acetate-dibutyl maleate copolymer as about 30% of a similar urethane in a blend. This is a distinct advantage commercially since the urethane material cost two times the vinyl acetate copolymer materials.

As used herein the terms "latex" or "emulsion" means a vinyl-terminated polymer dispersion in which water forms the continuous phase. Also as used herein the term "block" means a sequence of recurring units of the same monomer. When it is stated herein that the copolymer product is "crosslinked" it means that the copolymer has a three dimensional gelled network structure.

The molecular weight of the vinyl-containing prepolymer product of the instant invention can be varied within wide limits. For example, the molecular weight of the urethane prepolymer can be readily controlled by varying the amount of vinyl monomer containing only one active hydrogen that is reacted with the isocyanate groups in the prepolymer. That is, the more vinyl monomer containing only one active hydrogen that is reacted with the isocyanate, the shorter will be the length of the urethane chain after the subsequent chain extension and vice versa. The molecular weight of the vinyl portion can be controlled by the amount of vinyl monomer employed to copolymerize after the emulsification step with the vinyl-terminated prepolymer. The amount of vinyl monomer added to the emulsion copolymerization step also determines the relative proportion of prepolymer and vinyl blocks in the resultant vinyl-containing copolymer. Thus it is possible by the practice of this invention to vary the percentage of vinyl in the resultant copolymer product from less than 1% up to 99 or more.

The resultant copolymer latex product of the instant invention is a cross-linked copolymer structure consisting of vinyl and vinyl terminated prepolymer blocks. Ordinarily, because of the relative cost, the vinyl portion will make up the longer backbone chains and the prepolymer portion will act as the crosslinking block between the vinyl chains. However, in certain instances it may be desirous to have the prepolymer block as the longer backbone and form crosslinks from the vinyl blocks. If such is the case, then as aforestated it is only necessary to vary the amount of vinyl monomer containing only one active hydrogen and the amount of vinyl monomer added to the copolymerization step in the desired manner.

It is to be noted that the instant invention is not limited to a urethane-vinyl copolymer latex. Other conventional polymers such as polyamides, polyethers, polyesters, polyolefins such as polyethylene, or polysulfides which can be reacted with conventional vinyl containing monomers to form vinyl-terminated, long chain, linear prepolymers are also operable in the practice of the instant invention as will be shown by examples hereinafter. For example, polyethylene can be oxidized to form terminal carboxyl groups and then esterified with hydroxy substituted vinyl compounds, e.g. hydroxy propyl acrylate. Polyethers or polyesters containing terminal hydroxy groups can be esterified with carboxyl containing vinyl monomers, e.g. acrylic acid. Polyamides containing terminal amine groups can be reacted with carboxyl containing vinyl compounds, e.g. crotonic acid. Polysulfides containing terminal sulfhydryl groups can be reacted with a carboxyl containing vinyl monomer to form thioesters. Due to the long chain length of these vinyl-terminated prepolymers, no chain extension step is necessary to impart good flexibility to the resultant crosslinked copolymer latex. Following the above reactions the long chain, vinyl-terminated prepolymer is mixed with or dissolved in a vinyl monomer and thereafter emulsified. Following the emulsification, the prepolymer and the vinyl monomer are copolymerized in the presence of a conventional radical initiator for emulsion polymerization. The resulting latex copolymer due to the long chain crosslinks afforded by the vinyl-terminated prepolymer, has good flexibility and excellent blocking resistance.

The following examples will describe but not limit various methods of making the vinyl copolymer latex of the instant invention containing prepolymers other than isocyanate prepolymers.

Example 7

Commercially available polyethylene having a density of 0.95, an RSV of 4.5, a melt index of 0.0, and a melting point of 135° C. was oxidized in oxygen in a ribbon blender at 120° C. for 60 hours. The resultant oxidized polyethylene had a melt index of 10,000, an RSV of 0.17, a density of 1.01 and a carboxyl content of 1.04 milliequivalents per g. of polymer.

100 parts of the thus oxidized polyethylene was then subjected to esterification with 12.8 parts of hydroxy propyl acrylate in 1,000 parts xylene in the presence of 0.2 parts p-toluene sulfonic acid as a catalyst and 0.2 parts of methyl ether of hydroquinone as a polymerization inhibitor. The mixture was heated to 130° C. to dissolve the reactants and a vacuum was applied until all the theoretical amount of water (0.1 mole) had distilled over. The xylene was stripped off until only 200 parts remained in the system. 20 parts of the resultant vinyl-terminated acrylic ester in xylene was charged to a Sorvall Omni-Mixer (500 ml.) along with 80 parts of vinyl acetate, 2 parts of a commercial emulsifier sold under the trade name "Elvanol 50–42," 3 parts of an emulsifier sold under the trade name "Abex VA 40," 0.05 parts of a potassium persulfate polymerization initiator, 0.05 parts of sodium bicarbonate (buffer) and 100 parts of water. The mixture was emulsified for 2 minutes at 16,000 r.p.m. The thus emulsified product was transferred to a glass lined pressure kettle equipped with thermometer and stirrer. The kettle was sealed and copolymerization in the kettle was carried out for 1½ hrs. with stirring at 140° C. and 60 p.s.i. pressure. The reaction was then cooled to room temperature. The resultant crosslinked vinyl acetate-ester-terminated polyethylene copolymer latex exhibited excellent blocking resistance and good toughness.

Example 8

A polyester was prepared by reacting 50 parts propylene glycol and 100 parts adipic acid in the presence of 0.2 part of p-toluene sulfonic acid as a catalyst. The mixture was brought to 130° C. with stirring. Gradually the pressure was reduced and the temperature raised so that after about 3 hrs. the pressure was 5 mm. Hg and the temperature was 210° C. The amount of propylene glycol distilled over corresponded to a molecular weight of 2,000 with both ends of the chain terminated by hydroxy groups.

100 parts of the propylene glycol terminated with hydroxy groups was then esterified with 7.2 parts acrylic acid in the presence of 0.2 parts methyl ether of hydroquinone at a temperature of 130–200° C., until the theoretical amount of water for complete esterification had been obtained.

20 parts of the vinyl terminated ester was charged to a Sorvall Omni-Mixer (500 ml.) along with 80 parts vinyl acetate, 2 parts of a commercial emulsifier sold under the trade name "Elvanol 50–42," 30 parts of an emulsifier sold under the trade name "Abex VA 40," 0.05 parts of a potassium persulfate polymerization initiator, 0.05 parts of sodium bicarbonate and 100 parts of water.

The mixture was emulsified for 5 minutes at 16,000 r.p.m. The thus emulsified product was transferred to a glass resin kettle equipped with a thermometer and reflux condenser. The kettle was maintained at 70° C. bath temperature. Copolymerization in the kettle was carried out for 1½ hrs. with stirring under reflux at 70–75° C. The reaction was then cooled to room temperature. The vinyl-polyester copolymer latex exhibited enhanced flexibility, good blocking resistance and shelf stability.

Example 9

A polyamide was prepared from 100 parts adipic acid and 100 parts hexamethylenediamine (36% excess). The mixture was heated together under vacuum while being brought to 130° C. with stirring. Gradually the pressure was reduced and the temperature raised so that after three hours the pressure was 5 mm. Hg and the temperature was 190° C. The entire reaction was run under a blanket of nitrogen. Sufficient hexamethylenediamine was distilled over to leave a polymer having a molecular weight of 2,000 terminated at both ends with amine groups.

100 parts of the amine-terminated polymer and 8.7 parts crotonic acid were heated together under vacuum while the mixture was brought to 130° C. with stirring. Gradually the pressure was reduced and the temperature raised so that after 3 hours the pressure was 5 mm. Hg and the temperature was 210° C. 20 parts of the thus formed crotonate-terminated polyamide was charged to a Sorvall Omni-Mixer (500 ml.) along with 80 parts of methyl acrylate, 2 parts of a nonionic emulsifier sold under the trade name "Igepal CO 880" by General Aniline, 3 parts of a polyvinyl alcohol sold under the trade name "Elvanol 50–40" by E. I. DuPont de Nemours Co., 0.1 part potassium persulfate, 0.1 part sodium bicarbonate and 80 parts of water. The mixture was emulsified for 5 minutes at 16,000 r.p.m. at ambient temperature and pressure. The thus emulsified product was transferred to a glass resin kettle equipped with thermometer and reflux condenser wherein the copolymerization reaction was carried out for 2 hours with stirring at 70° C. On cooling, the vinyl-polyamide copolymer latex was found to possess unusual toughness and flexibility with a shelf stability in excess of 6 months.

The crosslinked vinyl containing copolymer latexes of the instant invention are especially useful where good flexibility and toughness are required. Thus, the vinyl containing copolymer emulsions can be used for paper coating, wood coating, cement coating and the like.

What is claimed is:

1. The process of forming a stable urethane-vinyl copolymer latex which comprises (1) reacting an isocyanate terminated prepolymer with 0.1 to 1 mole of a vinyl monomer containing only one active hydrogen to form a prepolymer containing isocyanate groups and terminated at one end by a vinyl group,
(2) chain extending said prepolymer by reacting it with at least a stoichiometric amount of a compound containing a plurality of active hydrogen atoms capable of reacting with all the isocyanate groups present thus forming a chain-extended urethane-containing prepolymer terminated on both ends with a vinyl group,
(3) dissolving the chain-extended, vinyl-terminated urethane-containing prepolymer in a vinyl monomer containing at least one $CH_2=C<$ group thereby forming a solution containing 5–75% of the chain-extended, vinyl-terminated urethane-containing prepolymer,
(4) forming an emulsion of said solution in water with agitation in the presence of an emulsifying agent capable of giving oil-in-water emulsions, and
(5) copolymerizing the vinyl monomer with the vinyl end groups of the prepolymer in said emulsion in the presence of a free radical emulsion polymerization catalyst.

2. The process according to claim 1 wherein the vinyl monomer containing only active hydrogen is of the formula

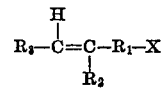

where $R_1$ is a member of the group consisting of

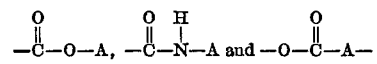

$R_2$ is a member of the group consisting of H,

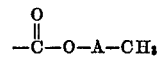

and an alkyl containing 1 to 2 carbon atoms, $R_3$ is a member of the group consisting of H,

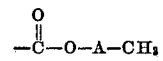

and an alkyl containing 1 to 2 carbon atoms and X is a member of the group consisting of —OH, —SH, —NH, —NH₂, —COOH, —CONH₂, —CONH—A—CH₃, —CSNH₂, —SO₂NH₂ and SO₂OH, where in all the aforesaid formulas A is an alkylene group containing 1 to 2 carbon atoms.

3. The process according to claim 2 wherein the vinyl monomer containing only one active hydrogen is selected from the group consisting of acrylic esters, methacrylic esters, vinyl esters, maleate esters, fumarate esters, itaconate esters, aconitate esters, citraconate esters, crotonate esters, acrylic amides, methacrylic amides and maleic amides.

4. The process according to claim 1 wherein the vinyl monomer containing at least one $CH_2=C<$ group is a member of the group consisting of substituted and unsubstituted vinyl carboxylic esters and amides and styrene.

References Cited

UNITED STATES PATENTS

| | | | |
|---|---|---|---|
| 3,256,226 | 6/1966 | Fekete et al. | 260—861 |
| 3,297,745 | 1/1967 | Fekete et al. | 260—77.5 |
| 3,306,866 | 2/1967 | Percival et al. | |
| 2,882,260 | 4/1959 | Barte et al. | 260—873 |
| 3,049,505 | 8/1962 | Grabawski | 260—859 |
| 3,297,745 | 1/1967 | Fekete et al. | |

FOREIGN PATENTS

| | | |
|---|---|---|
| 820,005 | 9/1959 | Great Britain. |
| 732,276 | 4/1966 | Canada. |

MURRAY TILLMAN, Primary Examiner

H. ROBERTS, Assistant Examiner

U.S. Cl. X.R.

117—155, 148, 161; 260—859, 857, 861, 872, 874, 878, 77.5